(12) United States Patent
Chen

(10) Patent No.: US 7,010,310 B2
(45) Date of Patent: Mar. 7, 2006

(54) METHOD OF WIRELESSLY ACCESSING NETWORK

(75) Inventor: Yu-Sheng Chen, Taipei Hsien (TW)

(73) Assignee: Inventec Appliances Corp., Taipei Hsien (TW)

(*) Notice: Subject to any disclaimer, the term of this patent is extended or adjusted under 35 U.S.C. 154(b) by 190 days.

(21) Appl. No.: 10/627,612

(22) Filed: Jul. 28, 2003

(65) Prior Publication Data
US 2005/0026632 A1 Feb. 3, 2005

(51) Int. Cl.
H04Q 7/20 (2006.01)
H04L 12/28 (2006.01)
A61B 5/00 (2006.01)
A61N 1/08 (2006.01)

(52) U.S. Cl. ............ 455/459; 370/401; 370/338; 600/300; 607/60

(58) Field of Classification Search ............... 455/459, 455/433, 277.1, 11.1; 370/401, 338, 329, 370/328, 311; 340/10.42; 709/220; 600/300; 607/60
See application file for complete search history.

(56) References Cited

U.S. PATENT DOCUMENTS

| | | | |
|---|---|---|---|
| 2002/0019584 A1* | 2/2002 | Schulze et al. ........... 600/300 |
| 2002/0039882 A1* | 4/2002 | Ternullo et al. ........... 455/11.1 |
| 2002/0080756 A1* | 6/2002 | Coppola et al. ........... 370/338 |
| 2002/0194414 A1* | 12/2002 | Bateman et al. ........... 710/303 |
| 2003/0021250 A1* | 1/2003 | Willins et al. ........... 370/338 |
| 2003/0041125 A1* | 2/2003 | Salomon ........... 709/220 |
| 2003/0167079 A1* | 9/2003 | Birnbaum et al. ........... 607/60 |
| 2003/0174049 A1* | 9/2003 | Beigel et al. ........... 340/10.42 |
| 2003/0202486 A1* | 10/2003 | Anton et al. ........... 370/329 |
| 2003/0210658 A1* | 11/2003 | Hernadez et al. ........... 370/311 |
| 2003/0210700 A1* | 11/2003 | Chen ........... 370/401 |
| 2004/0022210 A1* | 2/2004 | Frank et al. ........... 370/328 |
| 2004/0127185 A1* | 7/2004 | Abrahams et al. ........... 455/277.1 |
| 2004/0209615 A1* | 10/2004 | Lamb et al. ........... 455/433 |

\* cited by examiner

Primary Examiner—William Trost
Assistant Examiner—Kiet Doan
(74) Attorney, Agent, or Firm—Bacon & Thomas, PLLC

(57) ABSTRACT

The present invention is to provide a method of wirelessly accessing network enabling a user to use his/her cellular phone to access the Internet in any place any time by coupling an 802.11 interface of the cellular phone to a computer also having an 802.11 interface. Thus, data can be transmitted securely between the cellular phone and the internet in faster rate by taking advantage of the 802.11 interface of high data transfer rate and frequency jumping technique. Further, locations of both the cellular phone and the computer can be adjusted as needed. In other words, neither the cellular phone nor the computer is needed to fix at the same place.

1 Claim, 2 Drawing Sheets

METHOD OF WIRELESSLY ACCESSING NETWORK

FIELD OF THE INVENTION

The present invention relates to network accessing and more particularly to a method of wirelessly accessing a network (e.g., Hinet available from Chunghwa Telecom Company in Taiwan) by a host (e.g., personal computer or notebook computer) via a mobile communication device (e.g., cellular phone).

BACKGROUND OF THE INVENTION

This is a fast changing age due to quick information exchange. Also, people have an increasing demand for obtaining information and for exchanging information. Hence, for keeping up with the trend, many people use cellular phones as an indispensable tool of their daily life. It only takes several years from the birth of cellular phone to the worldwide use thereof. For some people, they even own more than one cellular phone. Cellular phones have increased interaction and information exchange among people. It is typical that you may find a busy person, whether on the street, subway, or doing other things, using a cellular phone for making or receiving a call at any time of the day. Moreover, many cellular phone manufacturers state that their cellular phones can cover all communication regions. In other words, a person can use the cellular phone for communication at any place. Further, more advanced features are added in a cellular phone in which Internet accessing is an important one of the features for the convenience of user.

However, Internet accessing speed of a conventional cellular phone is very slow. Also, the cellular phone is less convenient than a personal computer (PC) or notebook computer (NB) in accessing the Internet. This is because many keys of the cellular phone are multiple input keys. Also, the keys are closely arranged. It is often that a user may delete previous input data if enough care is not taken. Hence, it is time consuming and inconvenient. Further, it is often that a businessman may take a PC or NB while traveling. As such, the businessman can use the PC or NB to retrieve information from the Internet or to handle some emergency things on the Internet. However, sometimes there is no telephone line available for coupling the PC or NB to the Internet. As such, the only choice for a computer is to access the Internet via a cellular phone.

As stated above, Internet accessing speed of a conventional cellular phone is very slow. Also, the cellular phone is less convenient than the PC or NB in accessing the Internet. Further, a cellular phone has become more compact for ease of being carried by a user. Unfortunately, it is a very difficult and time consuming task of inputting data from a cellular phone. To the worse, many keys of the cellular phone are multiple input keys. It is often that a user may delete previous input data if enough care is not taken.

Thus, it is desirable to provide a fast network permitting an access thereto in any place any time. Next, it is possible of taking advantage of the popularity of cellular phones and 802.11 technique of high data transfer rate in cooperation with a PC or NB. Eventually, a network capable of transferring data in a high rate in any place any time is obtained by combining all of the above components together.

The operating principle of the above 802.11 technique of high data transfer rate is that not only data but also voice can be sent in a frequency of 2.45 GHz. Each 802.11 connecting device has a 48 bit address defined by IEEE (Institute of Electrical and Electronics Engineers) 802. It can be connected in a one-to-one or one-to-many mode with a transfer distance ranged from about 10 meters to about 100 meters. The 802.11 technique not only has a high data transfer capacity but also permits an encryption. A frequency switch rate is about 1,600 times per minute. Frequency can be divided into a plurality of small channels by means of frequency jumping technique. Further, a signal is transmitted among the channels randomly for preventing one electronic device from interfering with the other. Initially, the data transfer rate is from about 21 Kbps to about 432 Kbps. Desirably, it will reach up to 2 Mbps in the near future.

Moreover, signal sent by the 802.11 technique has a strong penetration capability. In a typical example, it can penetrate into a wall about 10 meters. Hence, data transferred by the 802.11 technique can be carried out irrespective of the existence of wall, pocket, or briefcase. In addition, the 802.11 technique can carry out a data transfer rate higher than that of an IR (infrared) transmission. Additionally, a data transfer rate of the 802.11 technique is about 20 times higher than that of a conventional modem.

It is understood that a cellular phone is portable. Hence, a user does not need to worry about no network available for accessing the Internet at any time if a cellular phone is combined with the 802.11 technique. As such, it is possible of quickly, wirelessly accessing the Internet by taking advantage of both a cellular phone incorporated the 802.11 technique and a host incorporated the 802.11 technique. Further, a recipient at the other end of the Internet can quickly receive data by means of the 802.11 technique of high data transfer rate.

In view of the above, there are many restrictions about accessing the Internet by means of a PC or NB in ay place any time. In another aspect, calls made by cellular phones are increased gradually and more and more people have at least one cellular phone. Thus, it is desirable to combine a cellular phone incorporated the 802.11 technique by taking advantage of the high data transfer rate of the 802.11 technique in which a cellular phone incorporated the 802.11 technique is combined with a PC or NB incorporated the 802.11 technique. As such, the PC or NB can access the Internet via the cellular phone for transferring data by utilizing the 802.11 technique. This is desirable among vast users.

SUMMARY OF THE INVENTION

A primary object of the present invention is to provide a method of wirelessly accessing network. The present invention enables a user to use his/her cellular phone to access the Internet in any place any time by coupling an 802.11 interface of the cellular phone to a computer also having an 802.11 interface. Moreover, data can be transmitted securely between the cellular phone and the internet in faster rate by taking advantage of the 802.11 interface of high data transfer rate and frequency jumping technique. Further, locations of both the cellular phone and the computer can be adjusted as needed. In other words, neither the cellular phone nor the computer is needed to fix at the same place. By utilizing the present invention, the above drawback of the prior art can be overcome. These drawbacks are that no telephone line is available for coupling a PC or NB to the Internet when the PC or NB is carried by a person leaving the office. Also, Internet accessing speed of a prior cellular phone is very slow. Further, the cellular phone is less convenient than the PC or the NB in accessing the Internet. Furthermore, many keys of the cellular phone are multiple input keys.

Another object of the present invention is to provide a method of wirelessly accessing network for greatly reducing hardware cost. In detail, a user does not need to install a network cable. Also, a user can adjust the locations of both the cellular phone and the computer as needed. Further, the cellular phone carried by a user can be used as a modem. Hence, the purpose of quickly accessing the Internet in any place any time can be achieved.

The above and other objects, features and advantages of the present invention will become apparent from the following detailed description taken with the accompanying drawings.

DETAILED DESCRIPTION OF THE PREFERRED EMBODIMENTS

Figure 1:
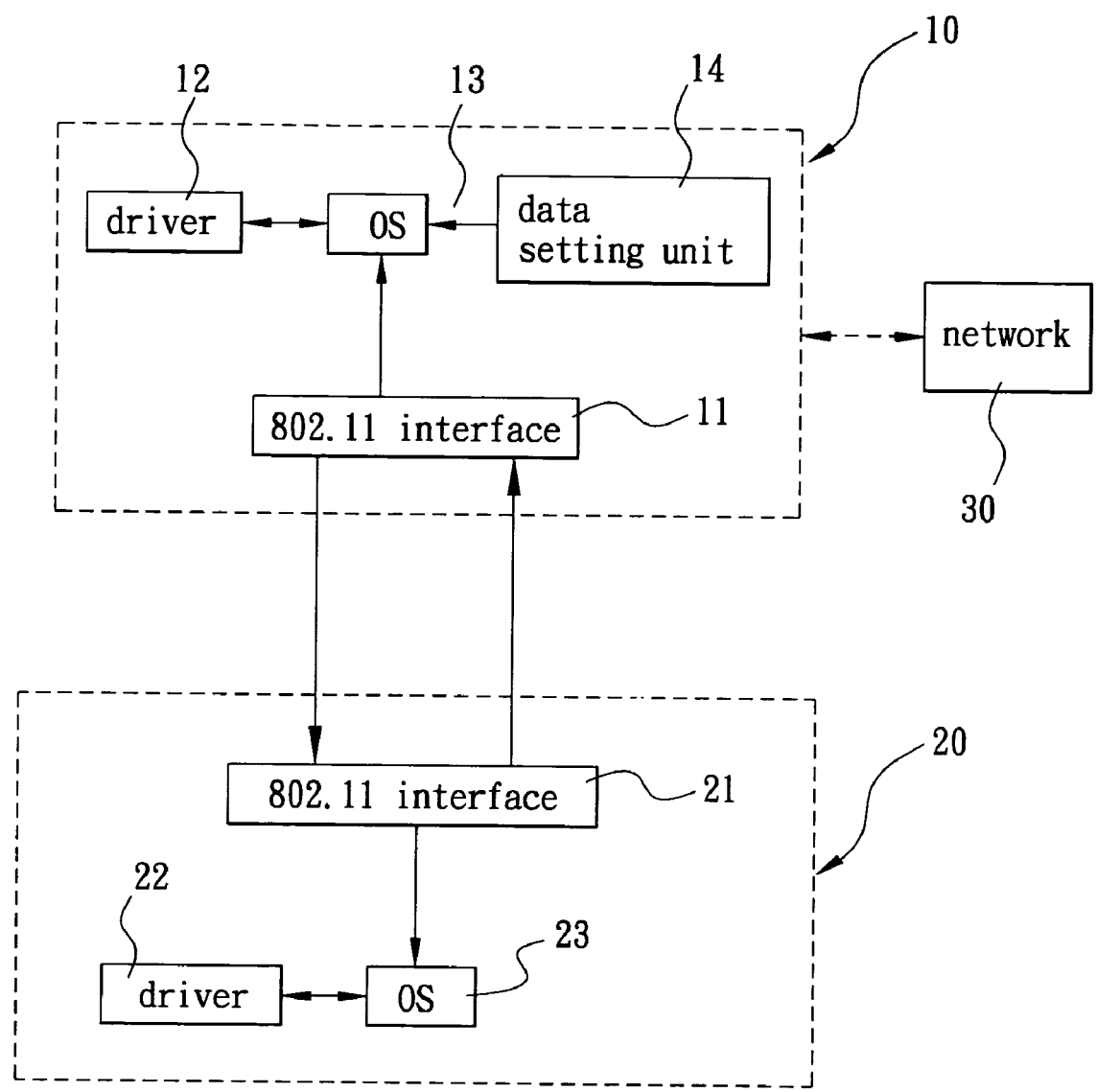
FIG. 1 is a block diagram according to the invention.

Referring to FIG. 1, there is shown a method of wirelessly accessing network in accordance with the invention. The method is implemented in a mobile communication device (e.g., cellular phone) 10 capable of accessing the Internet and a host (e.g., PC or NB) 20 in which a 802.11 interface 11 of high data transfer rate is provided in the mobile communication device 10 and a 802.11 interface 21 of high data transfer rate is provided in the host 20 respectively. The host 20 further comprises an operating system 23. After a connection between the 802.11 interface 21 of the host 20 and the 802.11 interface 11 of the mobile communication device 10 has been detected, the operating system 23 of the host 20 will receive a data setting from the mobile communication device 10 and then activates a driver 22 of the host 20. As such, signal about the connection of the mobile communication device 10 and a network (e.g., Hinet for accessing the Internet) 30 will be transmitted to the mobile communication device 10. After receiving the connection signal by the mobile communication device 10, a driver 12 of the mobile communication device 10 will be activated for finishing the setting of the mobile communication device 10. At the same time, a connection to the network 30 is established. In such a manner, a user can wirelessly access the network 30 by means of the host 20 via the mobile communication device 10.

Referring to FIG. 1 again, in the structure of the invention the mobile communication device 10 comprises a driver 12, an operating system 13, a data setting unit 14, and a 802.11 interface 11. The host 20 comprises a driver 22, an operating system 23, and a 802.11 interface 21. After a connection between the 802.11 interface 21 of the host 20 and the 802.11 interface 11 of the mobile communication device 10 has been detected, the mobile communication device 10 can be viewed as a modem. Next, the host 20 can carry out a dialing via the mobile communication device 10. At the same time, the host 20 will request the mobile communication device 10 to send data settings from the data setting unit 14 to the 802.11 interface 21 of the host 20 via the 802.11 interface 11. After receiving the data settings by the 802.11 interface 21 of the host 20, the operating system 23 is activated. As a result, a signal for interconnecting the mobile communication device 10 and the network 30 is transmitted to the mobile communication device 10 via the 802.11 interface 21 of the host 20 and the 802.11 interface 11 of the mobile communication device 10.

In addition, after the 802.11 interface 11 of the mobile communication device 10 receiving a signal for interconnecting the host 20 and the network 30, the signal is then transmitted to the operating system 13 of the mobile communication device 10. Next, the operating system 13 will activate the driver 12 for finishing the setting of the mobile communication device 10 and at the same time for connecting to the network 30.

As stated above, the mobile communication device 10 is taken as modem by the invention. Hence, the host 20 can be coupled to the network 30. And in turn, the host 20 takes advantage of technologies of the high data transfer rate of the 802.11 interfaces 11 and 21. The technology is a combination of communication and information technologies involving radio transmission. Its purpose is to overcome the constraints imposed by different connectors and communication specifications of the current electronic devices, computers, and communication devices and integrate them. It is implemented as an open platform. Thus, any two electronic devices incorporating the technologies of the 802.11 interfaces 11 and 21 can communicate each other freely.

Figure 2:
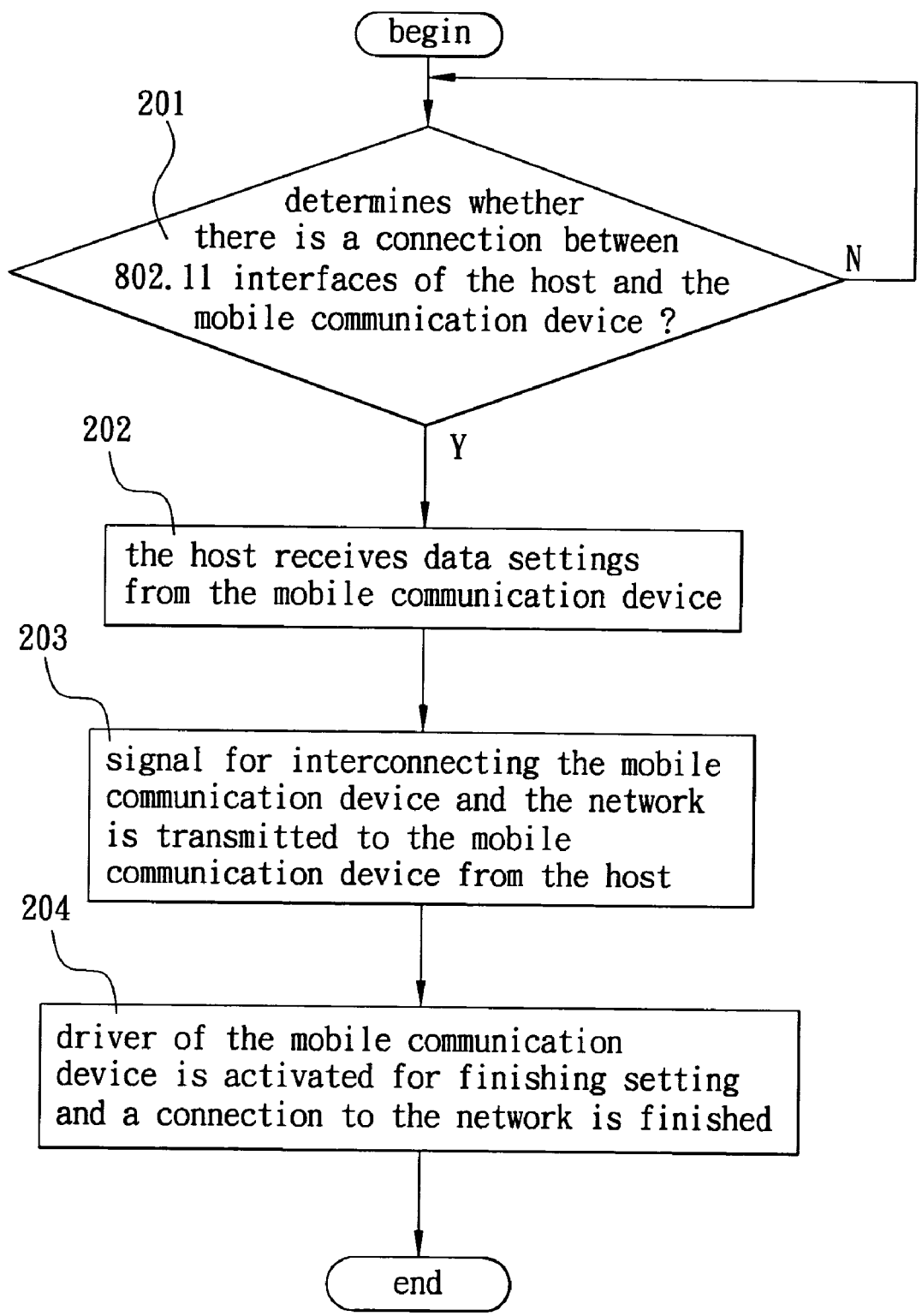
FIG. 2 is a flow chart showing a sequence of method steps performed by the invention.

Referring to FIG. 2 in conjunction with FIG. 1, a process of wirelessly accessing the Internet by the host 20 via the mobile communication device 10 comprises the steps of:

In step 201, first the operating system 23 of the host 20 detects and determines whether a connection between the 802.11 interface 21 of the host 20 and the 802.11 interface 11 of the mobile communication device 10 has been established. If yes, the process goes to step 202. Otherwise, the process loops back to itself for continuation.

In step 202, the host 20 requests the mobile communication device 10 to send data settings from the data setting unit 14 to the 802.11 interface 21 of the host 20 for receiving via the 802.11 interface 11.

In step 203, activate the driver 22 of the host 20. Also, a signal for interconnecting the mobile communication device 10 and the network 30 is transmitted to the mobile communication device 10 via the 802.11 interface 21 of the host 20 and the 802.11 interface 11 of the mobile communication device 10.

In step 204, after the mobile communication device 10 receiving a signal for interconnecting itself and the network 30 from the host 20, the driver 12 of the mobile communication device 10 will be activated for finishing the setting of the mobile communication device 10. At the same time, a connection to the network 30 is finished and the process of wirelessly accessing the Internet by the host 20 via the mobile communication device 10 is ended. In such a manner, a user can wirelessly access the network 30 by means of the host 20 via the mobile communication device 10.

As stated above, the invention is embodied in a computer, a cellular phone, and a Databank for wireless data transfer. Thus, the computer, the cellular phone, the Databank, etc. can be integrated with a telephone and a computer at home or office. Also, a three-in-one machine can have the capabilities of data transfer, printing, etc. by integrating the computer, the cellular phone, the Databank, and a fax. Further, the invention is adapted to embody at home or office. The only requirement is that each coupled device should have the 802.11 interfaces 11 and 21.

The method of wirelessly accessing network by a host via a mobile communication device of the invention is embodied by taking advantage of the 802.11 interfaces 11 and 21. Hence, the invention allows two devices, even not aligned, to transfer data wirelessly. As to other wireless data transfer techniques such as IR data transfer, the most significant drawback thereof is that a user has to align two ports prior to transferring data. Also, a data transfer distance thereof is at most 2 meters.

While the invention has been described by means of specific embodiments, numerous modifications and variations could be made thereto by those skilled in the art without departing from the scope and spirit of the invention set forth in the claims.

What is claimed is:

1. A method of wirelessly accessing a network implemented in a mobile communication device capable of accessing the Internet and a host, the mobile communication device having an interface of high data transfer rate and the host having an interface of high data transfer rate respectively, the method comprising the steps of:

in response to detecting a connection between the interface of the host and the interface of the mobile communication device by an operating system of the host, the operating system of the host receiving a data setting from the mobile communication device;

activating a driver of the host;

transmitting a signal of connecting the mobile communication device and a network together to the mobile communication device; and in response to receiving the connection signal by the mobile communication device, activating a driver of the mobile communication device and at the same time, for establishing the connection to the network, wherein the interface is an 802.11 interface disposed in the mobile communication device, the mobile communication device further comprising:

an operating system for receiving the signal from the host and for controlling;

a driver for activating the mobile communication device, finishing the data setting, and for establishing the connection to the network; and a data setting unit for setting data; and the host, in addition to the 802.11 interface, further comprising;

an operating system for detecting the connection between the interfaces; and a driver for activating the host and for transmitting the connection signal to the mobile communication device, and wherein a process of wirelessly accessing the network by the host via the mobile communication device comprises the steps of:

causing the operating system of the host to detect and to determine whether a connection between the 802.11 interface of the host and the 802.11 interface of the mobile communication device has been established;

causing the host to request the mobile communication device to send data settings from the data setting unit to the 802.11 interface of the host for receiving via the 802.11 interface of the mobile communication device if the determination is positive;

activating the driver for the host;

transmitting the signal of connecting the mobile communication device and the network together to the mobile communication device via the 802.11 interface of the host and the 802.11 interface of the mobile communication device; and in response to receiving the signal of connecting the mobile communication device and the network together from the host by the mobile communication device, activating the driver of the mobile communication device for finishing the setting of the mobile communication device and at the same time, for establishing the connection to the network.

* * * * *